(12) United States Patent
Kurtz et al.

(10) Patent No.: US 7,533,518 B2
(45) Date of Patent: May 19, 2009

(54) SYSTEM AND METHOD FOR REDUCING NOX EMISSIONS IN AN APPARATUS HAVING A DIESEL ENGINE

(75) Inventors: Eric Kurtz, Brookfield, WI (US); Daniel Roettger, Eynatten (BE); Evangelos Karvounis, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 11/128,750

(22) Filed: May 12, 2005

(65) Prior Publication Data

US 2006/0254259 A1     Nov. 16, 2006

(51) Int. Cl.
*F01N 3/00* (2006.01)

(52) U.S. Cl. .................. 60/285; 60/274; 60/277; 60/286; 123/295; 123/305; 123/430

(58) Field of Classification Search ............... 60/277, 60/285, 300, 274, 278, 280, 286; 123/295, 123/300, 305, 430, 431
See application file for complete search history.

(56) References Cited

U.S. PATENT DOCUMENTS

| | | | | |
|---|---|---|---|---|
| 5,207,058 A | * | 5/1993 | Sasaki et al. | 60/284 |
| 5,479,775 A | * | 1/1996 | Kraemer et al. | 60/274 |
| 5,642,705 A | * | 7/1997 | Morikawa et al. | 123/300 |
| 5,732,554 A | | 3/1998 | Sasaki et al. | |
| 5,956,942 A | * | 9/1999 | Sebastiano et al. | 60/274 |
| 5,975,046 A | * | 11/1999 | Kaneko et al. | 123/300 |
| 6,041,591 A | * | 3/2000 | Kaneko et al. | 60/274 |
| 6,161,519 A | | 12/2000 | Kimura et al. | |
| 6,171,565 B1 | * | 1/2001 | Hohne et al. | 423/239.1 |
| 6,185,935 B1 | * | 2/2001 | Dickers et al. | 60/300 |
| 6,293,095 B1 | * | 9/2001 | Yamamoto et al. | 60/286 |
| 6,519,931 B2 | * | 2/2003 | Fujieda et al. | 60/280 |
| 6,536,209 B2 | * | 3/2003 | Fluga et al. | 60/284 |
| 6,666,020 B2 | * | 12/2003 | Tonetti et al. | 60/286 |
| 6,684,630 B2 | * | 2/2004 | Uchida et al. | 60/284 |
| 6,742,330 B2 | * | 6/2004 | Genderen | 60/286 |
| 6,742,492 B2 | | 6/2004 | Kimura | |
| 6,813,880 B2 | * | 11/2004 | Nishiyama et al. | 60/285 |
| 6,880,519 B2 | * | 4/2005 | Nakayama et al. | 123/295 |
| 6,883,468 B2 | * | 4/2005 | Lehman | 123/27 R |

FOREIGN PATENT DOCUMENTS

EP     1245817 A2     10/2002

* cited by examiner

*Primary Examiner*—Binh Q. Tran
(74) *Attorney, Agent, or Firm*—Julia Voutyras; Alleman Hall McCoy Russell & Tuttle LLP (57) ABSTRACT

A method of operating a diesel engine in a mechanical apparatus is disclosed, wherein the diesel engine includes a combustion chamber, and wherein the mechanical apparatus also including a catalyst configured to treat NOx emissions from the diesel engine. The method includes performing at least one early homogenization combustion in the combustion chamber, determining a temperature of the catalyst, and if the temperature of the catalyst is equal to or below a preselected temperature threshold, then performing at least one late homogenization combustion or diffusion combustion in the combustion chamber to raise a temperature of exhaust provided to the catalyst.

15 Claims, 5 Drawing Sheets

SYSTEM AND METHOD FOR REDUCING NOX EMISSIONS IN AN APPARATUS HAVING A DIESEL ENGINE

TECHNICAL FIELD

The present application relates to the field of automotive emission control systems and methods.

BACKGROUND AND SUMMARY

Controlling nitrogen oxide ("NOx") emissions in diesel engines has posed significant challenges to the automotive industry. Several different methods of controlling NOx emissions from diesel engines have been proposed. One type of method is generally known as low-temperature diesel combustion. This method utilizes an early or late injection of fuel into the combustion chamber of the engine so that the fuel burns at lower temperatures. The lower combustion temperatures produce lower concentrations of NOx byproducts.

Both the early and late injections of fuel allow the fuel to mix more thoroughly with air than ordinary diesel combustion, and are therefore sometimes referred to as "early homogenization combustion" and "late homogenization combustion," respectively. Likewise, ordinary diesel combustion may be referred to as "diffusion" combustion due to the fact that combustion occurs with comparatively less mixing of fuel and air in the cylinder.

While low temperature combustion is effective to reduce NOx emissions to a substantial degree, these techniques may still fail to remove sufficient NOx for a diesel engine to meet modern emissions standards. The inventors herein have recognized that the reduction of NOx emissions from a diesel engine may be more efficiently addressed by utilizing a method of operating a diesel engine that utilizes a catalyst configured to treat NOx emissions from the engine, wherein the method includes performing at least one early homogenization combustion in the combustion chamber, determining a temperature of the catalyst, and if the temperature of the catalyst is equal to or below a preselected temperature threshold, then performing at least one late homogenization combustion or diffusion combustion in the combustion chamber to raise a temperature of exhaust provided to the catalyst.

DETAILED DESCRIPTION OF THE DEPICTED EMBODIMENTS

Figure 1:
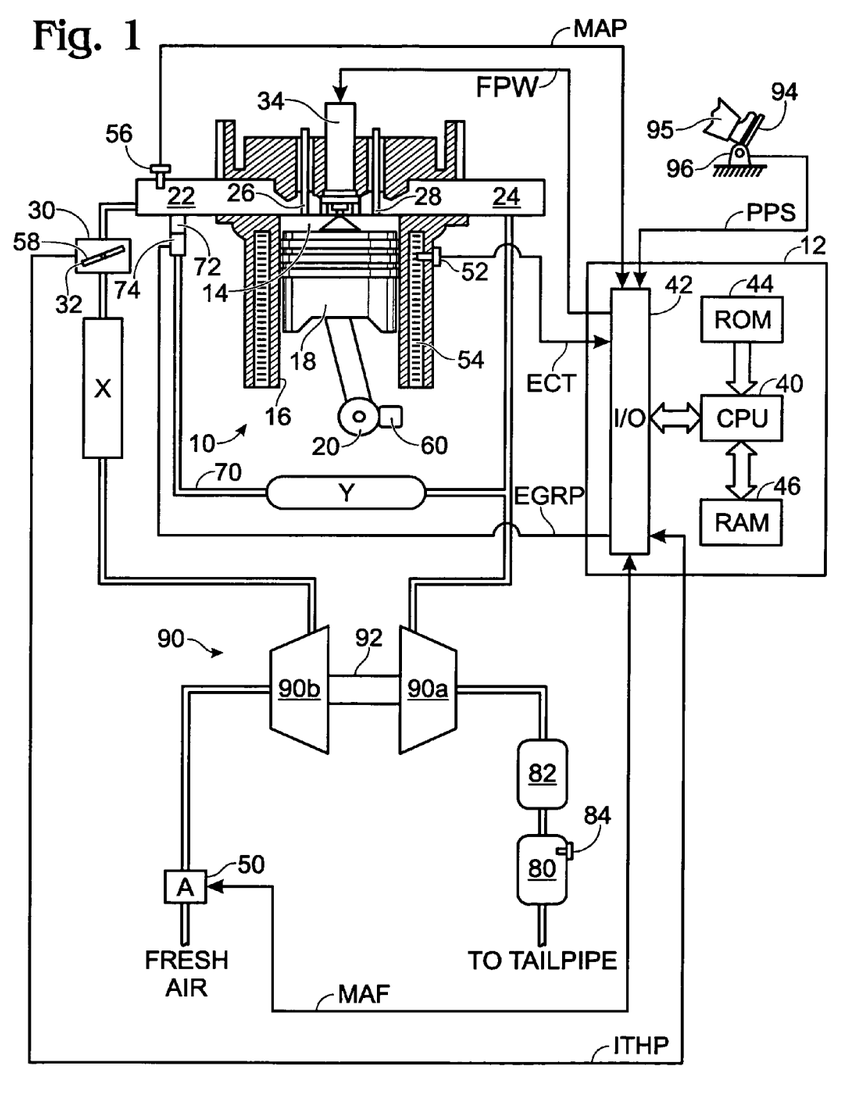
FIG. 1 is a schematic depiction of an exemplary embodiment of a diesel engine.

FIG. 1 shows an example of a diesel internal combustion engine system generally at 10. Specifically, internal combustion engine 10, comprising a plurality of cylinders, one cylinder of which is shown in FIG. 1, is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22.

Intake manifold 22 is also shown having fuel injector 34 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass air flow (MAF) from mass air flow sensor 50 coupled to the air filter [A on FIG. 1] (note that in a diesel engine, the air flow meter is typically read before the compressor; also note that the airflow sensor should be placed before the entrance point for a low pressure EGR (exhaust gas recirculation) loop); engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect sensor 60 coupled to crankshaft 20 indicating engine speed.

Engine 10 may include an exhaust gas recirculation (EGR) system to help lower NOx and other emissions. In the EGR system depicted in FIG. 1, exhaust gas is delivered to intake manifold 22 by an EGR tube 70 communicating with exhaust manifold 24. An EGR valve assembly 72 is located in EGR tube 70. Stated another way, exhaust gas travels from exhaust manifold 24 first through EGR valve assembly 72, and then to intake manifold 22. EGR valve assembly 72 can then be said to be located upstream the intake manifold. There is also optionally an EGR cooler [shown at Y in FIG. 1] placed in EGR tube 70 to cool recirculated exhaust gases before entering the intake manifold. Cooling is typically done using engine water, but and air-to-air heat exchanged could also be used.

Pressure sensor 56 provides a measurement of manifold pressure (MAP) to controller 12. EGR valve assembly 72 has a valve (not shown) for controlling a variable area restriction in EGR tube 70, which thereby controls EGR flow. EGR valve assembly 72 can either minimally restrict EGR flow through tube 70 or completely restrict EGR flow through tube 70.

A vacuum regulator 74 is coupled to EGR valve assembly 72. Vacuum regulator 74 receives actuation signals from controller 12 for controlling the valve position of EGR valve assembly 72. In a preferred embodiment, EGR valve assembly 72 is a vacuum actuated valve. However, any type of flow control valve may be used such as, for example, an electrical solenoid powered valve or a stepper motor powered valve.

Also, lean NOx catalyst or trap 80 and particulate filter 82 are shown coupled in the exhaust path downstream of a compression device 90. Compression device 90 can be a turbocharger or any other such device. Compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used.)

Further, controller 12 may receive a measurement of a temperature of NOx trap 80 from a temperature sensor 84 associated with NOx trap 80. Alternatively, sensor 84 may be positioned such that it provides an indication of exhaust gas temperature, or exhaust manifold temperature. However, placing sensor 84 adjacent to or within NOx trap 80 instead of adjacent to or within exhaust manifold 24 may allow the temperature of NOx trap 80 to be more accurately determined, as there may be substantial temperature drop in the turbine 90a.

Further, drive pedal 94 is shown along with a driver's foot 95. Pedal position sensor (pps) 96 measures angular position of the driver actuated pedal.

Further, engine 10 may also include exhaust air/fuel ratio sensors (not shown). For example, either a 2-state EGO sensor or a linear UEGO sensor can be used. Either of these can be placed in the exhaust manifold 24, or downstream of devices 80, 82 or 90.

It will be understood that the depicted diesel engine 10 is shown only for the purpose of example, and that the systems and methods described herein may be implemented in or applied to any other suitable engine having any suitable components and/or arrangement of components.

As described above, the low-temperature diesel combustion can help reduce NOx emissions in a diesel engine. Low-temperature diesel combustion may be achieved either by early homogenization combustion or late homogenization combustion. Early homogenization combustion may offer some advantages over late homogenization combustion. For example, early homogenization combustion offers greater fuel efficiency than late homogenization combustion, as more energy from early homogenization combustion is used to perform work on the piston than in late homogenization combustion. Conversely, more energy is lost as heat in late homogenization combustion than in early homogenization combustion.

In general, early homogenization in a diesel engine can be described as a combustion mode in which fuel and air are mixed substantially before top dead center and combustion starts near top dead center. Early homogenization can involve multiple in-cylinder injection strategies and/or fuel injection and premixing in the intake manifold, and has been applied on various combustion chamber configurations. This mode of combustion is typically characterized by very low particulate and NOx emissions and good efficiency; however, relatively low exhaust temperatures at a given load are also typical.

Diffusion combustion can be generally described as a combustion mode in which at least part of fuel injection and part of combustion occur simultaneously. Consequently, it involves much later fuel-air mixing with respect to the combustion event. In this combustion mode, multiple injections strategies such as pilot, split main, and post injection can be used to control emissions and combustion rate. By this definition, this mode of combustion also includes a type of low temperature combustion known as smokeless-rich combustion as well as all conventional combustion strategies. This mode of combustion is typically characterized by higher particulate and NOx emissions (unless it is operated in a smokeless-rich combustion mode), and still offers relatively good efficiency, but can have higher exhaust temperatures than early homogenization at a given load.

Late homogenization can be generally described as a combustion mode in which fuel is injected prior to combustion (typically after top dead center), most of the fuel-air mixing occurs after top dead center, and combustion occurs during the expansion stroke. This method of combustion can also use some multiple injection strategies, although the possibilities of these strategies are more limited since the possibility of incomplete combustion or misfire increase as the piston moves away from TDC. Like early homogenization, this mode of combustion is typically characterized by very low particulate and NOx emissions, but efficiency tends to be lower than the other two modes and exhaust temperatures are typically higher at a given load.

Note that all of these combustion modes can and typically involve controlling parameters such as EGR, intake pressure, intake temperature, swirl, and injection pressure to control emissions as well as the timing and rate of combustion.

In general, early homogenization combustion is achieved by injecting fuel before top dead center either via intake manifold injection or direct injection into the combustion chamber, and late homogenization combustion is achieved by injecting fuel into the combustion chamber at crank angles between approximately TDC and 30 degrees past top dead center. Compared to early homogenization, the ignition delay becomes significantly shorter. Likewise, diffusion combustion may be achieved by injecting fuel into the combustion chamber at crank angles of between 40° before top dead center TDC and 80° after top dead center. For this case one can not actually observe any ignition delay—since this kind of combustion is initiated in a burning environment.

While low-temperature diesel combustion may significantly lower NOx emissions compared to conventional diesel combustion, NOx emissions may still be too high to meet current and/or future emissions standards. Therefore, a lean NOx catalyst (or "NOx trap" or "LNT") 80, may be used to further reduce NOx emissions. A NOx trap is a catalytic device configured to retain NOx when the engine is running a lean air/fuel mixture, and then to release and reduce the NOx when the engine runs a richer air/fuel mixture. A typical NOx trap includes one or more precious metals, and an alkali or alkaline metal oxide to which nitrogen oxides adsorb as nitrates when the engine is running a lean air/fuel mixture. The engine can then be configured to periodically run a richer air/fuel mixture. The nitrates decompose under rich conditions, releasing the NOx. This reacts with the carbon monoxide, hydrogen gas and various hydrocarbons in the exhaust over the precious metal to form $N_2$, thereby decreasing the NOx emissions and regenerating the trap.

Figure 2:
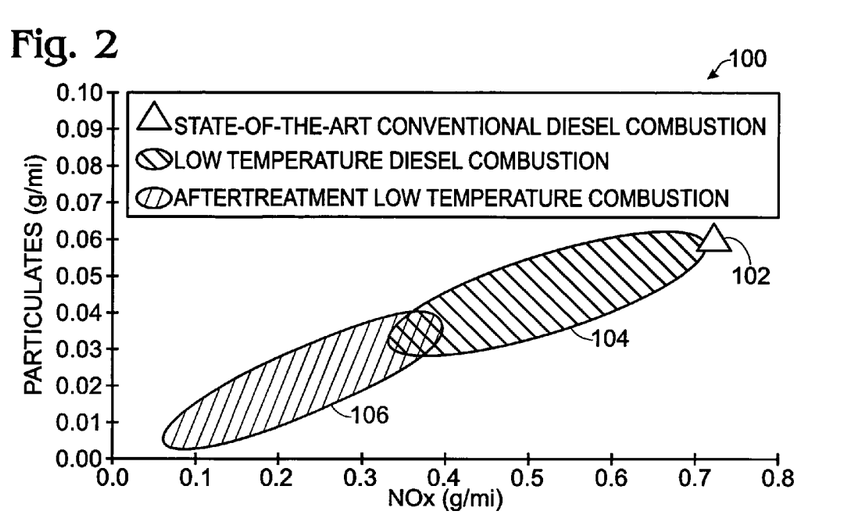
FIG. 2 is a graph showing a comparison of ranges of particulate and NOx emissions from a diesel engine utilizing only low temperature diesel combustion and a diesel engine utilizing low temperature diesel combustion in combination with catalytic aftertreatment.

FIG. 2 shows, generally at 100, a plot of particulate and NOx concentration ranges for various diesel emission systems. First, the current state-of-the-art particulate and NOx emissions concentrations are shown at 102. Next, an exemplary range of NOx and particulate concentrations achievable in emissions from an engine utilizing low temperature diesel combustion is shown as area 104. Finally, an exemplary range of NOx and particulate concentrations achievable in emissions from an engine utilizing both low temperature diesel combustion and aftertreatment (in the form of a NOx trap and a particulate filter) is shown as area 106.

Figure 3:
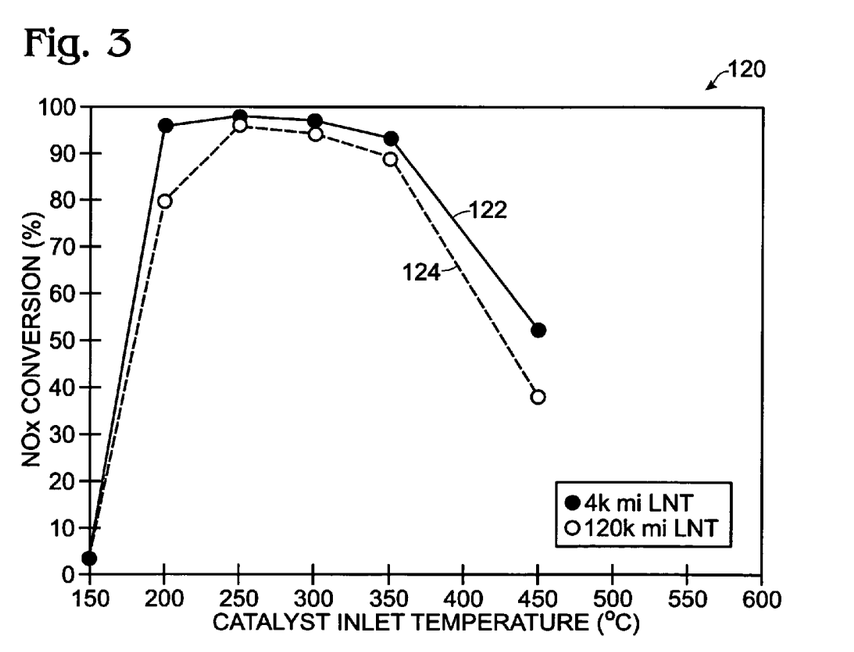
FIG. 3 is a graph showing a temperature dependence of a NOx conversion efficiency of an exemplary catalyst as a function of an inlet temperature of the catalyst.

As is evident from FIG. 2, the use of a combination of low temperature diesel combustion and catalytic aftertreatment may allow much lower NOx emissions to be achieved relative to the use of either method alone. However, some difficulties may be encountered in utilizing these methods together. For example, the NOx conversion efficiency of a NOx trap is dependent upon the temperature of the trap. FIG. 3 shows, generally at 120, a plot of the temperature dependence of an exemplary NOx trap after aging for 4,000 miles (at 122) and after aging for 120,000 miles (at 124). From FIG. 3, it can be seen that the NOx conversion efficiency of the exemplary NOx trap falls off at trap temperatures below approximately 200 degrees Celsius and above approximately 350 degrees Celsius. Therefore, maintaining the NOx trap approximately between these temperatures helps to ensure proper operation of the trap. It will be appreciated that these temperatures are merely exemplary, and that other NOx traps may have different operating temperature ranges.

Figure 4:
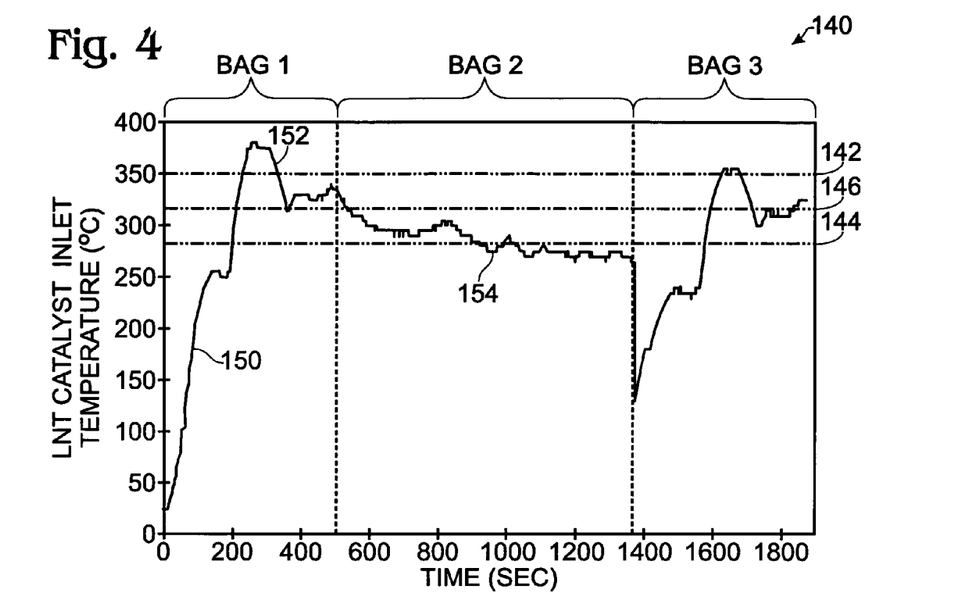
FIG. 4 is a graph showing an inlet temperature of an exemplary catalyst as a function of time for a diesel engine utilizing early homogenization combustion.

Due to the lower combustion temperatures and higher efficiency of early homogenization combustion, the exhaust from an engine utilizing early homogenization combustion may be too cool to keep the NOx trap within the optimal operating temperature range. FIG. 4 shows, generally at 140, a plot showing catalyst temperature as a function of time during an Environmental Protection Agency standard emissions test of a diesel automobile. The labels Bag 1, Bag 2 and Bag 3 refer to the emissions collected during three phases of the test: Bag 1 emissions are collected during a cold-start test, Bag 2 emissions are tested under city driving conditions, and Bag 3 emissions are tested under highway driving conditions. Also, a desired temperature range of a NOx trap is indicated by an upper temperature line 142 (shown at approximately 300 degrees Celsius), a lower temperature line 144 (shown at approximately 280 degrees Celsius), and a midpoint line 146 (shown at approximately 315 degrees Celsius). It should be noted that the relevant temperature window may depend upon catalyst type, formulation, and age/level of degradation. This can be seen, for example, in the different operating temperature ranges shown in FIGS. 2 and 3. Therefore, these factors may be taken into account when determining a temperature control strategy. Furthermore, the target temperature window may be adjusted depending on catalyst age (i.e. degradation) as measured by, for example, by miles of use, hours of use, total amount of fuel consumed, etc., or directly measured by monitoring catalyst performance using oxygen sensors, NOx sensors, etc. to measure levels of these gases in the exhaust downstream of the catalyst.

The NOx trap temperature as a function of time is shown at line 150. It can be seen that the NOx trap temperature sometimes exceeds the optimal operating temperature range, as indicated at 152, and sometimes falls below the optimal temperature range, as indicated at 154. Therefore, at these points in time, emissions from the automobile may have higher NOx emission levels than when the NOx trap is within the optimal temperature range.

In order to keep the temperature of the NOx trap within a desired operating range while also reducing NOx emissions via early homogenization combustion, engine 10 may be configured to perform at least one early homogenization combustion in the combustion chamber, determine a temperature of the catalyst, and if the temperature of the catalyst is equal to or below a preselected temperature threshold, then to perform at least one late homogenization combustion or diffusion combustion in the combustion chamber to raise a temperature of exhaust provided to the catalyst. In this manner, the benefits of early homogenization combustion may be realized while preserving good NOx trap performance.

Figure 5:
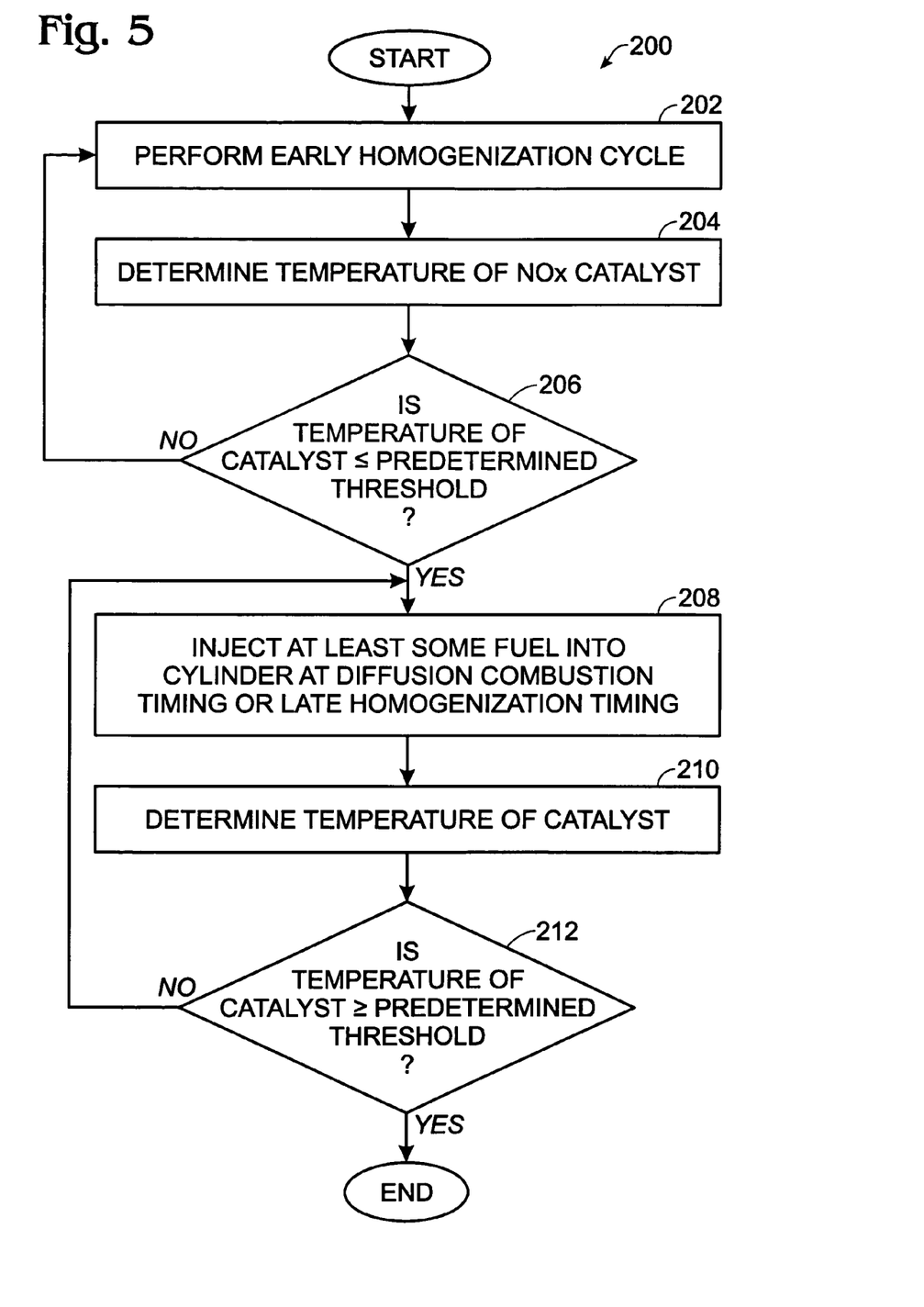
FIG. 5 is a flow diagram showing an exemplary embodiment of a method of controlling a temperature of a catalyst.

FIG. 5 shows, generally at 200, an exemplary embodiment of a method of controlling a temperature of NOx trap 80 by selectively employing at least one of diffusion combustion and late homogenization combustion in order to provide higher temperature exhaust to NOx trap 80. Method 200 includes performing an early homogenization engine cycle at 202, and determining a temperature of NOx trap 80 at 204. Next, the determined temperature of NOx trap 80 is compared to a predetermined temperature threshold at 206. If the temperature of the NOx trap is not equal to or less than the predetermined threshold, then engine 10 performs another early homogenization combustion cycle. In this manner, engine 10 operates in a primarily early homogenization combustion mode as long as the temperature of NOx trap 80 remains above the predetermined temperature threshold.

On the other hand, if it is determined at 206 that the temperature of the NOx trap is equal to or below the predetermined threshold, then, at 208, at least some fuel is injected into the combustion chamber at a timing configured to result in diffusion combustion and/or late homogenization to thereby raise the temperature of the engine exhaust. Next, at 210, the temperature of the NOx trap is again determined, and compared at 212 to a predetermined threshold to determine whether the NOx trap temperature is greater than or equal to the predetermined threshold temperature. If the temperature of the NOx trap determined at 210 is below the predetermined threshold, then another engine cycle with at least some fuel injected at a diffusion combustion and/or late homogenization timing is performed. On the other hand, if the temperature of the NOx trap determined at 210 is equal to or greater than the threshold, then method 200 exits and engine 10 may resume operating in a primarily early homogenization combustion mode.

The temperature-raising effect of the diffusion combustion and/or late homogenization combustion cycle or cycles may act rapidly. Therefore, engine 10 may be able to resume operation in the primarily early homogenization combustion mode relatively quickly.

The individual processes performed in method 200 may be performed in any suitable manner. For example, engine 10 may perform early homogenization cycles in any suitable manner. As described above, early homogenization combustion may be generally thought of as combustion that results from the injection of fuel at any point between the closing of air intake valve 52 and a crank angle of approximately 10 degrees before top dead center. However, it will be appreciated that fuel may alternatively be injected at a crank angle closer than 10 degrees from top dead center, and some of the benefits of early homogenization (such as higher combustion efficiencies) may still be enjoyed.

Likewise, the temperature of NOx trap 80 may be determined in any suitable manner. In the depicted embodiment, temperature sensor 84 is provided for measuring the temperature of NOx trap 80 (or exhaust gases within NOx trap 80) directly. Alternatively, temperature sensor 84 may be placed at a location in the emissions flow path either upstream or downstream of NOx trap 80, including but not limited to, within exhaust manifold 24, between turbine 90a and particulate filter 82, and between particulate filter 82 and NOx trap 80.

Furthermore, the temperature of NOx trap 80 may also be determined by indirect methods from other engine variables. For example, the temperature of NOx trap 80 may be determined from known quantities such as an amount of fuel injected, a timing of fuel injection or injections, a measured air/fuel ratio in the exhaust gas and/or an air-fuel ratio determined indirectly using a command fuel rate and a MAF measurement.

The predetermined temperature threshold to which the determined temperature of NOx trap 80 is compared may have any suitable value. Furthermore, the predetermined temperature threshold may differ depending upon the specific chemical and physical characteristics of a particular type of NOx trap. For a NOx trap with the NOx conversion efficiency v. temperature profile shown in FIG. 3, the predetermined temperature threshold may have a value of approximately 250 degrees Celsius, or even lower. Alternatively, if a narrower operating temperature window is desired (as shown in FIG. 4), the predetermined temperature threshold may have a value higher than 250 degrees Celsius, for example, on the order of 280-300 degrees Celsius. It will be appreciated that these temperature thresholds are merely exemplary, and that any other suitable predetermined temperature threshold may be used.

Next, if the temperature of the NOx trap is determined to be equal to or below the preselected temperature threshold, any suitable combination of diffusion combustion injection and/or late homogenization combustion injection may be used at 208. For example, in some embodiments, a single diffusion combustion injection may be used, without any accompanying early or late homogenization injection occurring in the same engine cycle. In other embodiments, a single late homogenization combustion may be used, without any accompanying early homogenization or diffusion combustion injection occurring during the same engine cycle.

In yet other embodiments, a multi-injection cycle may be used in which a quantity of fuel is injected at a diffusion combustion timing, and another quantity of fuel is injected at a late homogenization combustion timing. Furthermore, a multi-injection cycle may be used in which a quantity of fuel is injected at an early homogenization combustion timing, and another quantity (or quantities) of fuel is (are) injected at a diffusion combustion timing and/or a late homogenization combustion timing.

In embodiments where an early homogenization combustion injection is used in conjunction with a diffusion combustion injection and/or a late homogenization combustion injecting, the injections may be varied to achieve a desired exhaust temperature. For example, in an engine cycle that utilizes multiple injections, an injection pressure or a quantity of fuel injected in an early homogenization injection may be reduced, and an injection pressure or a quantity of fuel injected in a diffusion combustion injection and/or a late homogenization injection may be increased, to achieve a higher exhaust temperature. Alternatively, the relative timings of the early, diffusion, and/or late injections may be varied to achieve a desired exhaust temperature.

The actual injection quantities, injection pressures, and/or injection timings used to achieve a desired exhaust temperature and/or a desired NOx trap temperature may be determined experimentally, and stored in a look-up table within controller 12 that correlates the injection quantities, pressures, and/or timings with measured catalyst temperatures and/or other operating variables. Alternatively, the injection quantities, injection pressures, and/or injection timings to be used may be determined dynamically in any suitable manner.

The temperature threshold to which the catalyst temperature is compared at 212 may have any suitable value. For example, the temperature threshold utilized at 212 may have the same value as the temperature threshold utilized at 206 when determining whether a diffusion and/or late injection is needed, or may have a different value. It may be advantageous to utilize a higher temperature threshold at 212 than at 206 to avoid having the engine changing combustion modes at a higher than desired frequency.

Figure 6:
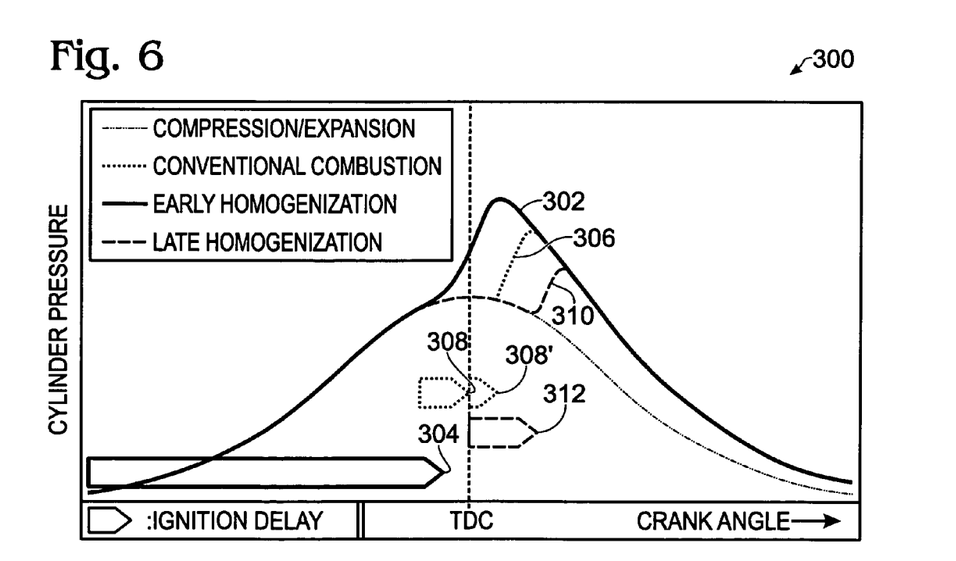
FIG. 6 is a graph showing a pressure within a combustion chamber in a diesel engine as a function of time for early homogenization, late homogenization, and conventional diesel combustions.
Figure 7:
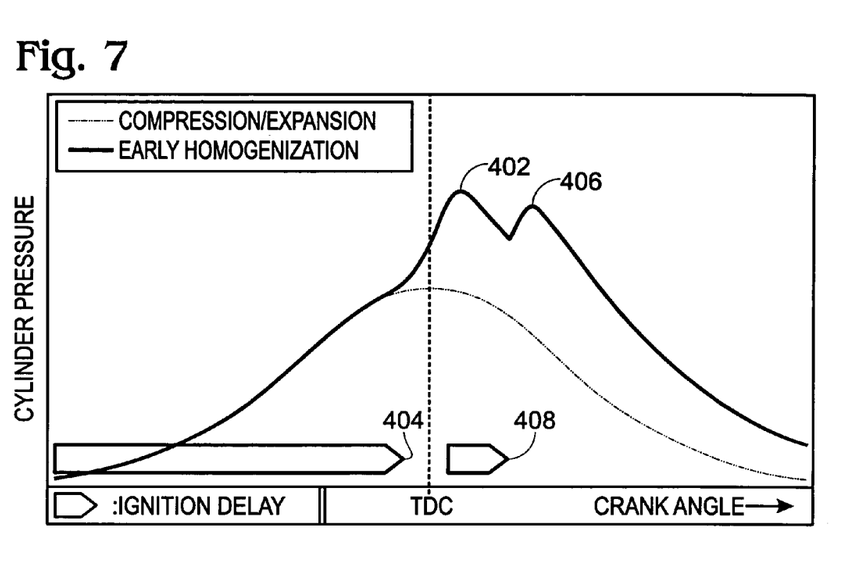
FIG. 7 is a graph showing a pressure within a combustion chamber in a diesel engine as a function of time for a multi-injection combustion that utilizes an early homogenization injection and a later injection.

FIGS. 6 and 7 illustrate the pressure within the cylinder of engine 10 as a function of various combustion timings. First, FIG. 6 illustrates, generally at 300, the pressure within a cylinder for each of an exemplary early homogenization combustion timing, two exemplary diffusion injection timings, and an exemplary late injection timing. The cylinder pressure of the early homogenization combustion is shown at 302, and the arrows represent the amount of time that passes between an earliest injection for that combustion mode and the start of combustion. Specifically, injection may occur at any point along the length of the arrow, and the beginning of combustion is illustrated by the tip of arrow 304. The early homogenization injection, represented by arrow 304, may occur anytime before TDC (with as many injections as the fuel system will allow), and ignition doesn't occur until near TDC.

The late homogenization fuel, represented by arrow 312, is injected near or after TDC and ignition doesn't occur until later in the expansion stroke. The cylinder pressure of the late homogenization combustion is shown at 310. The conventional combustion that is shown is a typically injection strategy in which a pilot injection, represented by arrow 308, is followed by a main injection, represented by arrow 308', and the cylinder pressure for conventional combustion is shown at 306. Pilot injection occurs before TDC and doesn't burn until near TDC, which increases intake temperature. The main injection occurs near TDC and the time between the start of the injection and the start of combustion is typically short because the pilot increased temperature (as indicated by the short arrow on the second injection).

From FIG. 6, it can be seen that the cylinder pressure peaks at a higher and earlier point for the early homogenization combustion than for the other types of combustion, and provides for greater engine efficiency and fuel economy (but lower exhaust temperatures) than the other types of combustion.

FIG. 7 illustrates, generally at 400, the pressure within a cylinder of engine 10 during an exemplary multi-injection cycle in which a late homogenization combustion injection is utilized along with an early homogenization combustion injection to increase the temperature of exhaust from engine 10. A first peak 402 in the cylinder pressure occurs just after top dead center due to the early homogenization combustion injection, the timing of which is shown by the tip of arrow 404. Next, a second peak 406 in cylinder pressure occurs due to the late homogenization injection, the timing of which is illustrated by arrow 408. It will be appreciated that the second peak may occur closer in time (and crank angle) to the first peak where the second injection is performed at a diffusion combustion timing, rather than at a late homogenization timing. Furthermore, while the depicted embodiment utilizes one early homogenization injection and one late homogenization injection, it will be appreciated that either more or fewer injections may be used to provide an exhaust stream of a desired temperature. Additionally, while the embodiments described herein utilize later injection timings to provide a higher temperature exhaust stream, it will be understood that engine 10 may instead be configured to operate primarily in a late homogenization or diffusion combustion mode, and to employ early homogenization combustion as needed to cool an exhaust stream to achieve a desired emissions effect, if desired.

The methods described herein may be used to maintain any temperature-sensitive aftertreatment device in a desired temperature range. Examples of other catalytic devices for which the methods shown and described herein may be used include, but are not limited to, HC-SCR, Urea-SCR, three-way catalysts, and DPNR (4-way catalysts).

It will further be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various injection timings, combinations of injection timings, and other features, functions, and/or properties disclosed herein. Furthermore, the concepts disclosed herein may be applied to spark ignition engines as well as diesel engines, for example, petrol and hydrogen ICE engines. Spark ignition engines generally perform fuel-air mixing before top dead center. However, combustion in these engines can also be broken into the following two modes that an engine may be configured to switch between to control NOx (or other) aftertreatment temperature.

First, HCCI, PCCI, or similar combustion modes in spark ignition engines involve early fuel and air mixed and auto-ignition (ignition is typically unaided) at or near TDC due to compression heating. These combustion modes are similar to early homogenization in diesel engines. They are characterized by low NOx emissions and excellent efficiency compared to standard spark ignition ("SI") combustion; however, exhaust temperatures are typically lower at a given load. Next, SI combustion is a mode of combustion in which ignition is brought about when a spark creates a flame kernel in the surrounding region. This flame front then moves through the combustion chamber. This mode of combustion is characterized by high NOx emissions, relatively low efficiency, and high exhaust temperatures. In accordance with the concepts described above, compression combustion may be used as a default mode of the engine, and spark ignition combustion may be used when higher exhaust temperatures are desired to heat an aftertreatment device.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. In a mechanical apparatus including a diesel engine having a combustion chamber, the mechanical apparatus also including an aftertreatment device configured to treat emissions from the diesel engine, a method of operating the engine, comprising:

operating the engine with an early homogenization combustion mode;

determining a temperature of the aftertreatment device; and if the temperature of the aftertreatment device is equal to or below a preselected temperature threshold, then performing at least one late homogenization combustion in the combustion chamber to raise a temperature of exhaust provided to the aftertreatment device, while continuing operating the engine with the early homogenization combustion mode, the late homogenization combustion including a combustion mode where fuel is directly injected into the combustion chamber, a substantial portion of in-cylinder fuel and air mixing occurs after top dead center, and combustion occurs during the expansion stroke, wherein performing includes, in a single engine cycle, directly injecting fuel into the combustion chamber at a late homogenization combustion timing and injecting fuel into the combustion chamber at an early homogenization combustion timing, wherein the preselected temperature threshold is adjusted as a function of an aging of the aftertreatment device.

2. The method of claim 1, wherein the temperature of the aftertreatment device is determined directly via a temperature sensor associated with the aftertreatment device.

3. The method of claim 1, wherein the temperature of the aftertreatment device is determined indirectly from other engine variables.

4. The method of claim 1, wherein operating the engine in the early homogenization combustion mode includes injecting fuel before top dead center.

5. The method of claim 1, further comprising adjusting an injection pressure of fuel injected for the early homogenization combustion and an injection pressure of fuel injected for the late homogenization combustion based upon the temperature of the aftertreatment device.

6. The method of claim 1, further comprising adjusting a timing of an injection of fuel for at least the late homogenization combustion based upon the temperature of the aftertreatment device.

7. The method of claim 1, further comprising adjusting an amount of fuel injected for the early homogenization combustion and for the late homogenization combustion based upon the temperature of the aftertreatment device.

8. A method of operating a diesel engine having a combustion chamber and an aftertreatment device configured to treat emissions from the diesel engine, the method comprising:

performing a first, early injection of fuel directly in the combustion chamber to provide an early homogenization combustion mode when temperature of the aftertreatment device is above a threshold value; and performing, in a single combustion cycle, the first, early injection of fuel and a second, late injection of fuel directly in the combustion chamber to provide early and late homogenization combustion if the temperature of the aftertreatment device is equal to or below the threshold; where, in the late homogenization combustion, a substantial portion of in-cylinder fuel and air mixing occurs after top dead center and combustion occurs during the expansion stroke, where an injection pressure of fuel injected for the early homogenization combustion and an injection pressure of fuel injected for the late homogenization combustion are adjusted based upon the temperature of the aftertreatment device.

9. In a mechanical apparatus including a diesel engine having a combustion chamber, the mechanical apparatus also including an aftertreatment device configured to treat emissions from the diesel engine, a method of operating the engine, comprising:

operating the engine with an early homogenization combustion mode;

determining a temperature of the aftertreatment device;

if the temperature of the aftertreatment device is equal to or below a preselected temperature threshold, then performing at least one late homogenization combustion in the combustion chamber to raise a temperature of exhaust provided to the aftertreatment device, while continuing operating the engine with the early homogenization combustion mode, the late homogenization combustion including a combustion mode where fuel is directly injected into the combustion chamber, a substantial portion of in-cylinder fuel and air mixing occurs after top dead center, and combustion occurs during the expansion stroke, wherein performing includes, in a single engine cycle, directly injecting fuel into the combustion chamber at a late homogenization combustion timing and injecting fuel into the combustion chamber at an early homogenization combustion timing, wherein the preselected temperature threshold is adjusted as a function of an aging of the aftertreatment device; and further comprising adjusting an injection pressure of fuel injected for the early homogenization combustion and an injection pressure of fuel injected for the late homogenization combustion based upon the temperature of the aftertreatment device.

10. The method of claim 9, wherein the temperature of the aftertreatment device is determined directly via a temperature sensor associated with the aftertreatment device.

11. The method of claim 9, wherein the temperature of the aftertreatment device is determined indirectly from other engine variables.

12. The method of claim 9, wherein operating the engine in the early homogenization combustion mode includes injecting fuel before top dead center.

13. The method of claim 9, wherein the preselected temperature threshold is adjusted as a function of an aging of the aftertreatment device.

14. The method of claim 9, further comprising adjusting a timing of an injection of fuel for at least the late homogenization combustion based upon the temperature of the aftertreatment device.

15. The method of claim 9, further comprising adjusting an amount of fuel injected for the early homogenization combustion and for the late homogenization combustion based upon the temperature of the aftertreatment device.

* * * * *